United States Patent [19]

Tsuchiya et al.

[11] Patent Number: 4,988,859
[45] Date of Patent: Jan. 29, 1991

[54] OPTICAL WAVEFORM MEASURING DEVICE

[75] Inventors: Yutaka Tsuchiya; Shinichiro Aoshima, both of Shizuoka, Japan

[73] Assignee: Hamamatsu Photonics Kabushiki Kaisha, Shizuoka, Japan

[21] Appl. No.: 350,273

[22] Filed: May 11, 1989

[30] Foreign Application Priority Data

May 13, 1988 [JP] Japan ................................ 63-116732

[51] Int. Cl.⁵ ............................................. H01J 31/50
[52] U.S. Cl. ............................................. 250/213 VT
[58] Field of Search .................... 250/213 VT, 213 R; 330/4.3; 324/77 K

[56] References Cited

U.S. PATENT DOCUMENTS

| | | | |
|---|---|---|---|
| 3,350,566 | 10/1967 | Babits | 330/4.3 |
| 3,378,686 | 4/1968 | Langmuir | 330/4.3 |
| 3,644,042 | 2/1972 | Kolb, Jr. et al. | 330/4.3 |
| 3,863,166 | 1/1975 | Stimler | 330/4.3 |
| 4,232,333 | 11/1980 | Hiruma et al. | |
| 4,352,127 | 9/1982 | Tsuchiya | |
| 4,413,178 | 11/1983 | Mourou et al. | 250/213 VT |
| 4,611,920 | 9/1986 | Tsuchiya | |
| 4,645,918 | 2/1987 | Tsuchiya et al. | 250/213 VT |
| 4,661,694 | 4/1987 | Corcoran | 250/213 VT |
| 4,682,020 | 7/1987 | Alfano | 250/213 VT |
| 4,694,154 | 9/1987 | Tsuchiya et al. | |
| 4,714,825 | 12/1987 | Oba | 250/213 VT |
| 4,718,761 | 1/1988 | Tsuchiya | 250/213 VT |

FOREIGN PATENT DOCUMENTS

| | | |
|---|---|---|
| 44622 | 10/1981 | Japan . |
| 40709 | 8/1982 | Japan . |
| 40712 | 8/1982 | Japan . |
| 58745 | 4/1984 | Japan . |
| 104519 | 6/1984 | Japan . |
| 135330 | 8/1984 | Japan . |
| 183857 | 8/1986 | Japan . |
| 1517475 | 7/1978 | United Kingdom . |
| 2042163 | 9/1980 | United Kingdom . |
| 2044588 | 10/1980 | United Kingdom . |
| 2131165 | 6/1984 | United Kingdom . |
| 2133875 | 8/1984 | United Kingdom . |
| 2160739A | 12/1985 | United Kingdom . |

Primary Examiner—David C. Nelms
Assistant Examiner—Khaled Shami
Attorney, Agent, or Firm—Finnegan, Henderson, Farabow, Garrett and Dunner

[57] ABSTRACT

An optical waveform measuring device, comprising an optical amplifier for amplifying a light beam under measurement and a photodetector to which a light beam amplified by the optical amplifier is applied.

29 Claims, 10 Drawing Sheets

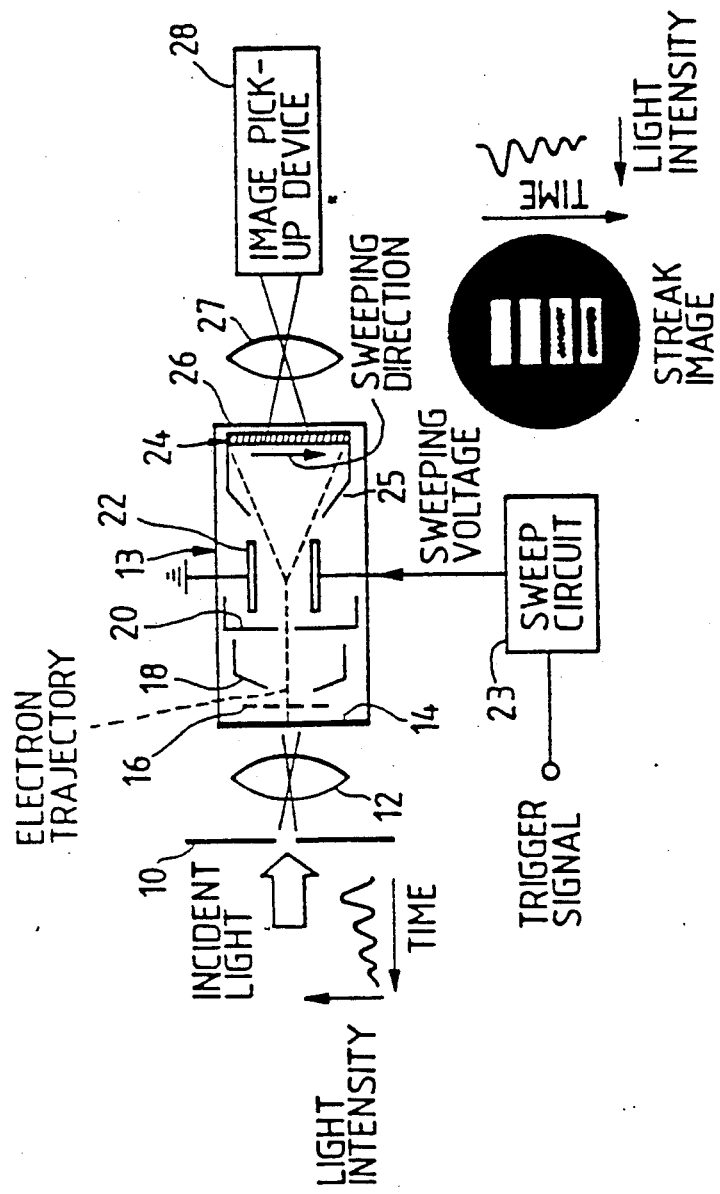

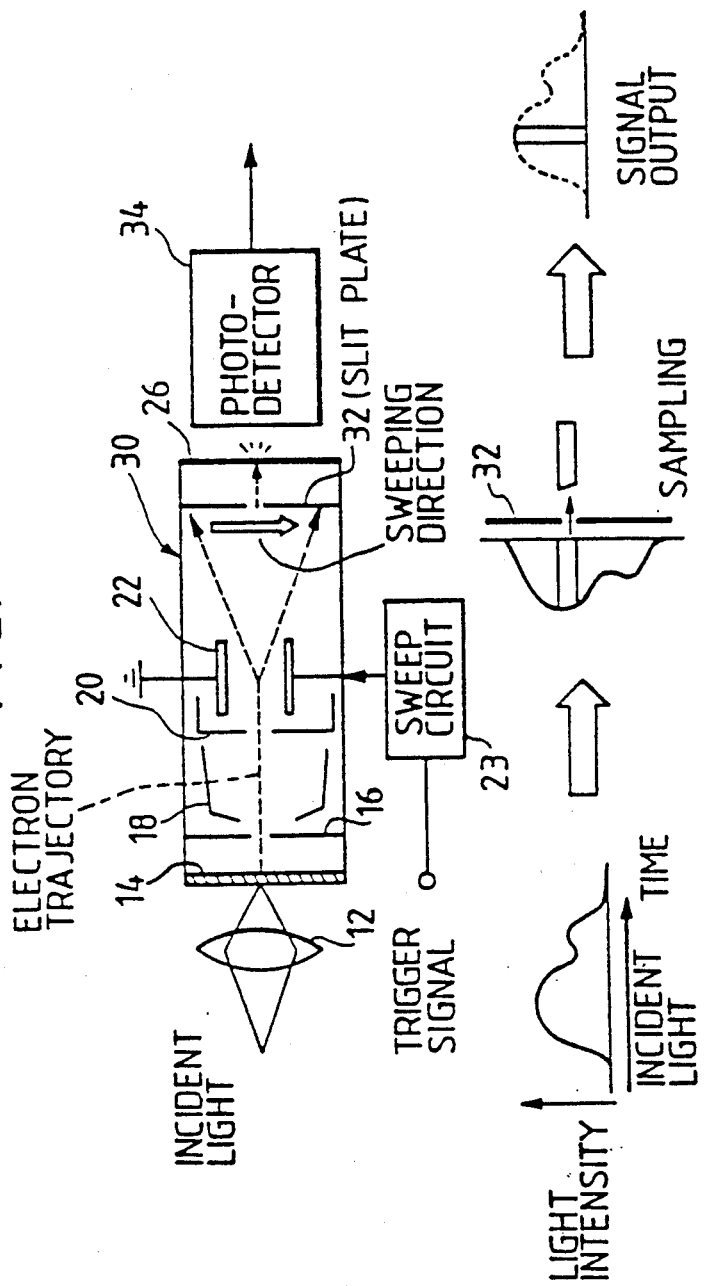

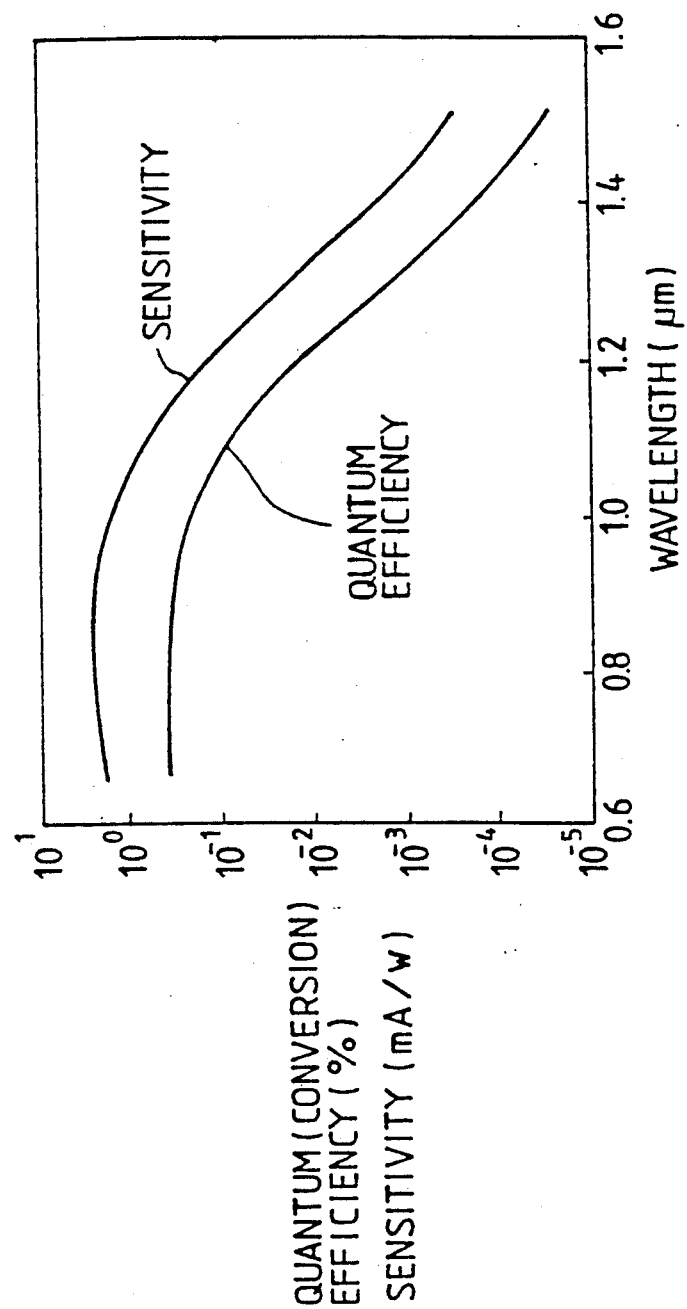

OPTICAL WAVEFORM MEASURING DEVICE

BACKGROUND OF THE INVENTION

1. Field of the Invention

This invention relates to optical waveform measuring devices, and more particularly to an optical waveform measuring device with a photodetector having a photocathode, such as a streak camera, which is suitable for measuring rays of low intensity light in an infrared ray region at high speed with high sensitivity.

2. Description of the Related Art

There are a variety of means available for measuring the transient behavior of ultra-high speed optical phenomeana. One of the measuring means employs a streak camera in which an incident light beam is converted into an electron beam at the photocathode of the streak tube. The electron beam is allowed to sweep at high speed, so that the intensity of an incident light beam, that changes with time, is measured as a variation in luminance with respect to position on the phosphor screen of the streak tube.

As shown in FIG. 17, an essential component of the streak camera, namely, a streak tube 13 comprises a photocathode 14 for converting light (slit image) into an electron image. The light is applied through a slit plate 10 and an image is formed by a lens 12 in the input optical system. The streak tube 13 also comprises a mesh-type accelerating electrode 16 for accelerating the electron image provided by the photocathode 14; deflecting electrodes 22 for deflecting the electron beam accelerated by the accelerating electrode 16 in a direction (that is a vertical direction in FIG. 17) perpendicular to the longitudinal direction of the slit at high speed; and a phosphor screen 26 for converting the electron image deflected by the deflecting electrodes 22 into an optical image (i.e., a streak image which is a luminance data image in which the vertical axis represents the lapse of time).

Further, as depicted in FIG. 17, the streak tube 13 may also include a focusing electrode for focusing the electron beam accelerated by the accelerating electrodes 16 to a certain degree; an aperture electrode (or anode) 20 for further accelerating the electron beam, a sweep circuit 23 for applying a predetermined sweep voltage across the deflecting electrodes 22 in synchronization with the passage of the electron beam; a microchannel plate (MCP) 24 provided in front of the phosphor screen 26 to multiply the number of electrons passed through the deflecting electrodes 22; a conical shield electrode 25 provided on the input side of the MCP 24, for blocking the electrons deflected out of the effective sweep region of the phosphor screen to improve the accuracy of measurement; and an image pickup means 28 comprising a high sensitivity image pick-up device such as an SIT camera or CCD camera for recording the streak image through a lens 27 in the output optical system.

Roughly stated, the above-described streak camera is classified in a single sweep type streak camera and synchro scan type streak camera depending on the operating principle employed; i.e., the sweep system employed. In the single sweep type streak camera, a linear sweep is carried out using an ultra-high speed sawtooth wave up to several kilo-Hertz (KHz) in synchronization with a pulse laser beam. In the synchro scan type streak camera, a high-speed repetitive sweep is carried out with a sine wave of 80 to 160 MHz in synchronization with a laser beam. In addition to the above-described two types of streak cameras, a synchronous blanking type streak camera has been developed in which an elliptic sweep is carried out. As shown in FIG. 18, the return portion of the elliptic sweep is shifted sideways so that the electron beam may not go across the phosphor screen 26.

The above-described conventional streak cameras have been disclosed, for instance, by Japanese patent application publication Nos. 44622/1981, 40709/1982 and 40712/1982, Japanese patent application (OPI) No. 58745/1984 and 183857/1986 (the term "OPI" as used herein means an "unexamined published application"), U.S. Pat. Nos. 4,232,333 4,352,127, 4,611,920, and 4,661,694, and GB Pat. Nos. 2042163, 2044588 and 2131165.

The above-described method using the streak camera is a pure-electronic direct method excellent in time resolution and in detection sensitivity. The method can measure single shot (non-repetitive) phenomena. In addition, since the streak image is originally two-dimensional, the method can be used for two-dimensional measurement such as time-resolved spectroscopic measurement or space-and-time-resolved measurement. Furthermore, when the materials of the photocathode and the incident window are selected, the method can perform measurement over a wide range of spectral sensitivity from near infrared region through vacuum ultraviolet region to X-ray region.

In addition, as shown in FIG. 19, a sampling type optical oscilloscope having a sampling streak tube 30 has been put in practical use. A slit board 32 for spatially limiting a streak image in a streak camera is provided, to electrically sample the streak image.

In FIG. 19, a photo-detector 34 detects the intensity of light that is emitted by a phosphor screen 26 when an electron beam strikes against the latter. Photodetector 34 may be a photo-multiplier tube, a high sensitivity photodiode, an avalanche photodiode, or a PIN photodiode.

The sampling type optical oscilloscope has been disclosed, for instance, by Japanese patent application (OPI) Nos. 104519/1984 and 135330/1984, U.S. Pat. Nos. 4,645,918 and 4,694,154 and GB Pat. No. 2133875.

A drawback of the devices and methods previously described is that they are not sufficiently sensitive and efficient in photo-electric conversion when used for measurement of low intensity light beams. When wavelengths are in the infrared region, for instance with wavelengths of 1.3 $\mu$m and 1.5 $\mu$m as is extensively employed for optical communication, the photocathode 14 used is an S-1 photocathode. The quantum (conversion) efficiency of the S-1 photocathode is on the order of $10^{-4}$ to $10^{-5}$ for wavelengths of 1.3 $\mu$m, and on the order to $10^{-6}$ for wavelengths of 1.6 $\mu$m. Thus, efficiency is very low. This is a fatal drawback if, for example, the light is passed through a long distance optical fiber, or is used for measurement in the field of photocounting optical communication.

SUMMARY OF THE INVENTION

An object of the present invention is to eliminate the above-described difficulties accompanying a conventional optical waveform measuring device.

Another object of the invention is an optical waveform measuring device that measures the waveforms of rays of light with high sensitivity even in a low intensity optical region.

The foregoing and other objects of the invention are achieved by an optical waveform measuring device comprising an optical amplifier for amplifying a light beam under measurement, and a photodetector having a photocathode to which a light beam amplified by the optical amplifier is applied.

In the device of the invention, the photodetector may be a streak tube, and the optical amplifier may be a non-resonance traveling-wave type optical amplifier comprising a semiconductor laser on both end faces of which anti-reflection films or coatings are formed to prevent optical reflection therefrom. The gain of the optical amplifier may be varied by an electrical signal, so that the optical amplifier serves also as a light gate.

A sampling slit plate may be provided for the photodetector, and the output thereof may be detected with another photodetector, so that the waveform of the light beam is measured from the sampling delay time. A light chopping element may be provided for turning on and off the light beam under measurement at a predetermined frequency, and a lock-in amplifier having a narrow band width may be used to detect only the frequency component out of the sampling output of the detector. Also the optical amplifier itself can have chopping capability.

Two or more optical amplifiers may be used for amplifying light, the outputs of which are applied through optical fibers to the photocathode of the photodetector in such a manner that they are arranged in a line on the photocathode. An image pickup device may be used to detect the optical image formed on the phosphor screen of the photodetector, and a display unit is provided to display the output signal of the image pickup device.

BRIEF DESCRIPTION OF THE DRAWINGS

The manner by which the above objects, and other objects, features, and advantages of the present invention are attained will be fully apparent from the following detailed description.

FIG. 17 is a cross-sectional view of a conventional streak camera;

FIG. 19 is a cross-sectional view depicting the operation of a sampling type optical oscilloscope; and FIG. 20 is a graphic representation indicating the spectroscope sensitivity characteristic of an S-1 photocathode employed in conventional infrared measurement.

DESCRIPTION OF THE PREFERRED EMBODIMENTS

Figure 1:
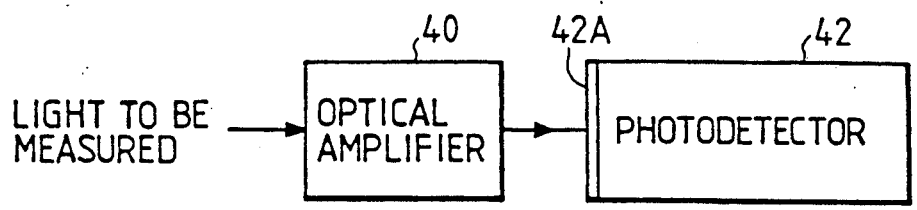
FIG. 1 is a schematic diagram showing the fundamental arrangement of an optical waveform measuring device in accordance with the present invention.

FIG. 1 is an explanatory diagram indicating the fundamental structure of an optical waveform measuring device according to the invention. In FIG. 1, an optical amplifier 40 is provided to amplify a light beam under measurement, and the light beam amplified by the amplifier 40 is applied to the photocathode 42A of a photodetector 42. This allows the optical waveform measurement to be achieved at high speed with high sensitivity allowing rays of light in the low intensity optical region to be measured. With the invention, incident rays of light can be amplified even in an infrared region for which the photocathode is low in conversion efficiency. Therefore, the sensitivity can be increased, and the measurement of optical waveforms longer in wavelength (for instance more than 300 nm) than those measured by the conventional method can be achieved. In particular, ultrahigh-speed optical waveform measurement can be carried out. Furthermore, when the gain of the optical amplifier 40 can be controlled, incident light in a wide range of intensity can be measured. In addition, when the optical amplifier 40 is employed as an optical gate with its gain controlled with an electrical signal, a high precision optical measurement can be achieved with a high S/N ratio.

Examples of the above-described photodetector 42 are a single sweep type streak camera, a synchro scan type streak camera, a synchronous blanking type streak camera, and a sampling type optical oscilloscope.

In streak tube 13 depicted in FIG. 17, photoelectrons, striking against the focusing electrode 18, the deflecting electrodes 22, etc., produce scattered electrons. Therefore, in general, a streak camera employs electrode gate for blocking unwanted photoelectrons immediately after they are emitted from the photocathode 14. This prevents the occurrence of a fogging phenomenon that otherwise may be caused by the scattered electrons. The gate may also be disposed between the photocathode and the accelerating electrode to apply a negative pulse voltage or a positive pulse voltage to the accelerating electrode 16. Alternatively, in order to block the photoelectrons produced by the light beam applied to the focusing electrode 18 in the rear stage or to block thermal electron noise caused in the microchannel plate (MCP) 24, an MCP gate may be used to drive the MCP 24 with a pulse voltage or a gate (elliptic sweep for synchronous blanking) by sweeping.

The above-described methods overcome the following difficulty. If the measurement of a low intensity light beam is followed by a light beam of high intensity, and the measurement is of highly repetitive pulsed light beams or long life fluorescence, the incidence of a light beam occurs during the return period of a period other than the effective sweep period of the streak camera. A false signal attributed to the above described scattered electrons or the incidence of light beam during the return period is superimposed on the signal component, resulting in erroneous measurement. However, when the gain of the above-described optical amplifier 40 can be controlled with an electrical signal, the optical amplifier 40 may be used, if its gain is set at zero, to readily gate(cut) the light beam. This method is the highest in efficiency because the optical signal under measurement is directly cut, and can prevent excessive incidence of light to the streak tube. In addition, it may be used in combination with a conventional electron gate. Furthermore, if, in an electrooptical synchro scan type streak camera, the optical amplifier 40 is driven in synchronization with the synchro scan frequency (80 to 200 MHz), false signals formed during the return period can be eliminated. On the other hand, the conventional streak camera is low in response except when an elliptic sweep is carried out. Therefore, it cannot perform the above-described blanking operation during the synchro scan period.

The optical amplifier 40 that is capable of producing an optical output by amplifying input light by a factor that is dependent on an external electrical signal is available in various types including: a non-resonant traveling-wave type optical amplifier (TWA) which has an anti-reflection film coated on both end faces of a semiconductor laser to suppress reflection from those faces; a Fabry-Perot type optical amplifier (FPA) which uses a conventional semiconductor laser as an optical amplifier with it being biased below the threshold level for oscillation; an optical fiber Raman amplifier which utilizes Raman scattering induced in an optical fiber; and amplifier using a DFB laser; and an injection synchronous amplifier. Semiconductor amplifiers are advantageous because of their compactness and ease of control in operation.

Among semiconductor optical amplifiers, TWA and FPA are particularly advantageous. TWA has fast response to electrical signals and its capable of amplification of high speed optical signals. Because of the absence of resonator-dependent selectivity for wavelength, TWA has a broad (ca. 50 nm) wavelength range for gain and assures consistency in gain in the face of variation in the temperature of the amplifier or in the wavelength of incident light. TWA is also superior in terms of gain saturation and noise characteristic which are two important characteristics of an optical amplifier. On the other hand, FPA is easy to fabricate and allows a high gain to be attained in the neighborhood of a threshold value even with low current injection because it utilizes multiple reflection between both end faces to produce signal gain.

Another advantage of the semiconductor optical amplifiers is that their gains can be easily adjusted by changing the amount of injection current, so they can also be used as an optical switch by turning on or off the injection of current as in the present invention.

Figure 2:
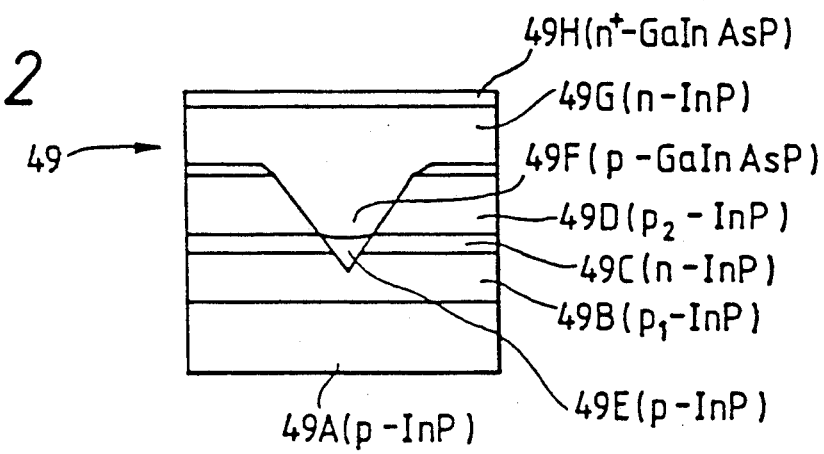
FIG. 2 is a cross-sectional diagram showing one example of the structure of a semiconductor laser forming a traveling-wave type optical amplifier (TWA) that is one example of an optical amplifier employed in the present invention.

A TWA that is suitable for use in the present invention has an anti-reflection film coated on both end faces of a semiconductor laser 49 of the VIPS (V-grooved inner stripe on p-substrate) structure shown in FIG. 2, which may be formed by the following steps: in the first cycle of liquid-phase growth, a $p_1$-InP buffer layer 49B, n-InP block layer 49C and $P_2$-InP block layer 49D are grown on a p-InP substrate 49A; thereafter a V-shaped groove having a (111)B face is formed in 49B, 49C and 49D by wet etching, with a $SiO_2$ stripe mask being prepared by a conventional photolithographic process; and in the second cycle of liquid-phase growth, a p-InP cladding layer 49E, a p-type or undoped GaInAsP active layer 49F, n-InP cladding la---  --- and n+-GaInAsP contact layer 49H are grown successively. The GaInAsP active layer 49F is formed at the bottom of the V-shaped groove, with its width and thickness being controlled to ca. 1.2 $\mu$m and 0.10 $\mu$m, respectively. Thereafter, electrodes are formed and end faces are created by cleavage. An anti-reflection film is then deposited onto both end faces of the resulting semiconductor laser 49 using a material such as $SiO_2$ so as to fabricate a TWA. The semiconductor laser 49 of the VIPS structure has a sufficiently high efficiency of injection into the active layer to produce superior high output characteristics, so the TWA using this semiconductor laser also produces high gain and highly saturated output.

Figure 3:
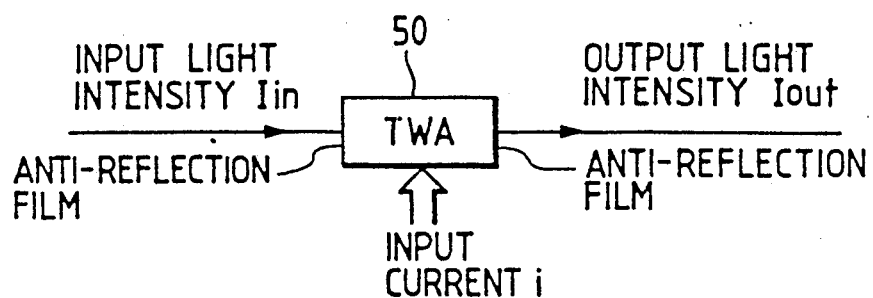
FIG. 3 is a schematic diagram of the operational characteristic of the TWA of FIG. 2.
Figure 4:
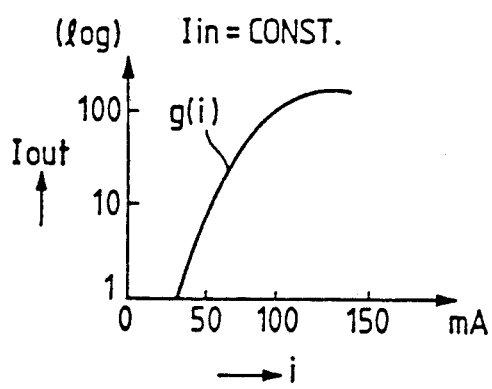
FIGS. 4 and 5 are graphical representations of examples of the output optical intensity characteristics of the TWA of FIG. 2.
Figure 5:
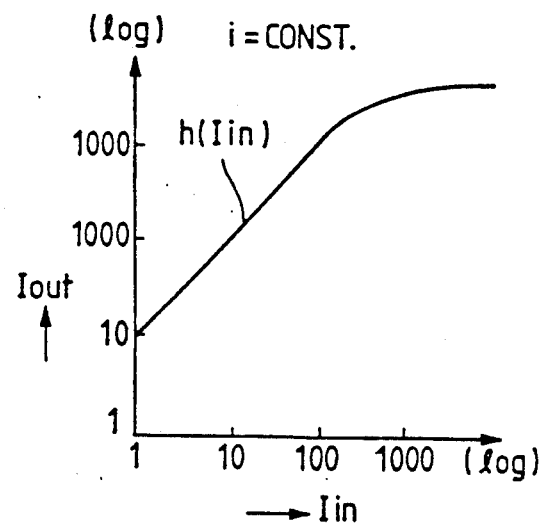

The TWA 50 thus fabricated has a basic composition as shown in FIG. 3. When the intensity of input light $I_{in}$ being launched into the TWA 50 is constant, the intensity of output light $I_{out}$ from the TWA 50 will change nonlinearly as shown in FIG. 4 in response to the change in input current i. If the value of input current i to the TWA 50 is constant, $I_{out}$ will change also nonlinearly as shown in FIG. 5 in response to the change in $I_{in}$. It can therefore be seen that when $I_{in}$ is constant, $I_{out}$ can be controlled by i, whereas $I_{out}$ can be controlled by $I_{in}$ when current i is constant.

Figure 6:
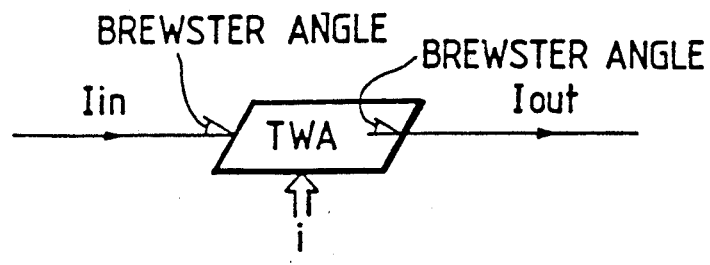
FIG. 6 is a diagram showing one modification of the TWA of FIG. 2.

In the TWA 50, reflection from both end faces is suppressed by the anti-reflection film coated thereon. It should, however, be noted that the anti-reflection film is not the sole mechanism for suppressing reflection from both end faces of the semiconductor laser and the same results can be attained by cutting each of the end faces at an angle equal to the brewster angle as shown in FIG. 6. In this case, the plane of polarization is restricted. However, this restriction may be an advantage in that any polarizer or analyer is unnecessary when a need arises for restricting the plane of polarization.

Figure 7:
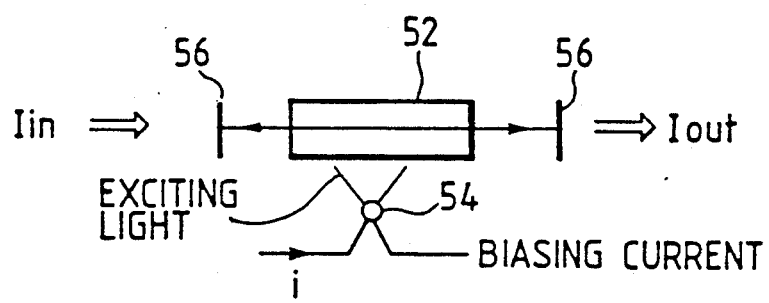
FIGS. 7,8,9, and 10 are diagrams showing other modifications of the TWA of FIG. 2.
Figure 8:
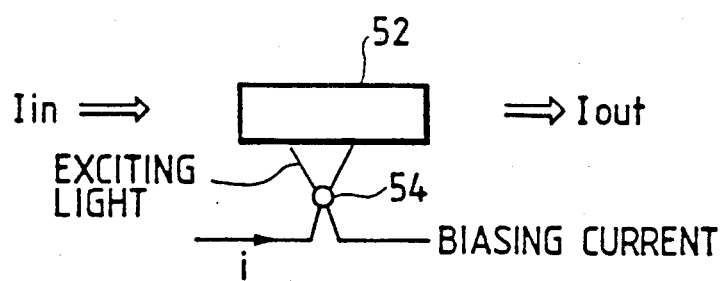

Besides the TWA 50 and FPA described above, other types of optical amplifiers can be used in the present invention, including the resonant optical amplifier show in FIG. 7 which is biased to a level below the threshold for oscillation by imparting excitation light to a solid state laser medium 52 with a semiconductor laser 54, and the non-resonant optical amplifier shown in FIG. 8 that is similar to TWA in which reflection from both end faces of the solid state laser medium 52 is suppressed by providing an anti-reflection film or adjusting the angle of each end face to be equal to the Brewster angle. In FIG. 7, the numeral 56 designates a resonant mirror. The semiconductor laser 54 may or may not be supplied with a bias current for attaining a value in the neighborhood of the threshold level.

Figure 9:
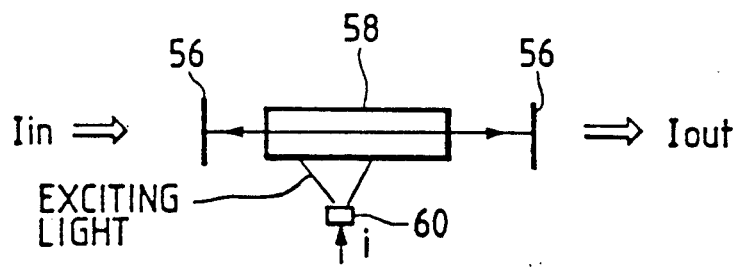

Another type of optical amplifier 40 that can be used in the present invention is shown in FIG. 9, in which a dye or gas laser medium 58 is excited with light from a semiconductor laser, a light-emitting diode or a current controlled lamp 60. Resonant mirrors 56 may be omitted from the system shown in FIG. 9.

Figure 10:
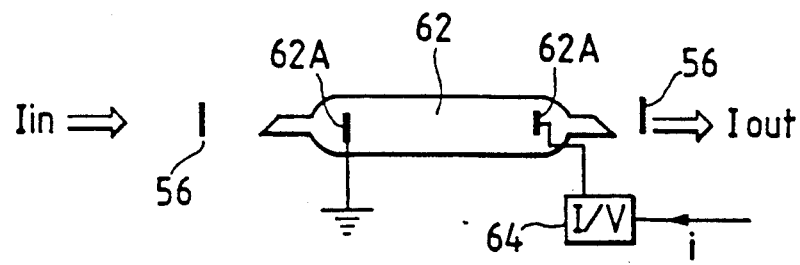

Still another type of optical amplifier that can be used in the present invention is shown in FIG. 10, in which a gas laser medium 62 is excited by discharge, or the voltage applied between electrodes 62A from a current-to-voltage converter 64. Resonant mirrors 56 may be omitted from the system shown in FIG. 10.

The above-described optical detector 42 may be, for instance, an electro-optical sampling type detector provided with a light sampling slit plane. Further, the device may be combined with a light chopping element for turning on and off a light beam under measurement at a predetermined frequency, and a lock-in amplifier that takes only the frequency component out of the sampling output of the optical detector 42 (sampling type optical oscilloscope). Using the above described combination, lock-in detection is carried out, which, in addition to the above-described effects, increases the S/N ratio.

The above-described light chopping element may be the ordinary light chopper, the above-described optical amplifier, an optical modulator having an electro-optical effect, an E-O modulator, an optical Kerr shutter, a liquid crystal shutter or the like. When the light chopping element is the optical amplifier whose gain can be controlled with an electrical signal, then the amplification factor can be increased.

In the case where the above-described optical amplifier 40 is designed to operate as the light chopping element, it goes without saying that it is unnecessary to provide a light chopping element, and the arrangement of the streak camera can be simplified.

Optical fibers may be employed in the input section of a light beam under measurement and/or in the coupling section between the optical amplifier 40 and the photocathode 42A. In this case, adjustment of the optical system is unnecessary, and the components may be made with a high degree of freedom, for instance the streak camera can be miniaturized.

In addition, a multi-channel streak camera can be formed using a streak tube with a fiber cable which has been disclosed, for instance, by Japanese patent application (OPI) No. 183857/1986.

Various embodiments of the invention will now be described in detail with reference to the accompanying drawings.

Figure 11:
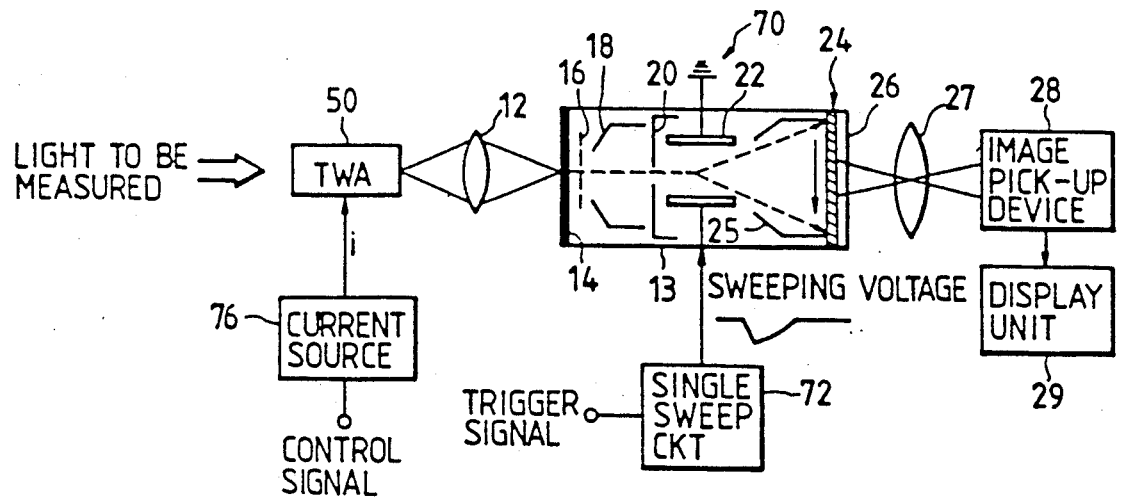
FIG. 11 is a schematic diagram depicting a first embodiment of an optical waveform measuring device in accordance with the present invention.

A first embodiment of the invention is designed as follows. The optical waveform measuring device has an optical amplifier 40 and photodetector 42 as shown in FIG. 1. As shown in FIG. 11, the optical amplifier 40 may be replaced with the above-described TWA 50, and the photodetector 42 may be replaced, for instance, with a single sweep type streak camera that has a streak tube 13 fundamentally arranged as shown in FIG. 17, and a single sweep circuit 72 for generating a sawtooth sweep voltage.

The gain of the TWA 50 is controlled by a current signal supplied from a current source 76. The current source 76 may be a constant current source 76. The current source 76 may be a constant current source when it is necessary to maintain a constant amplification factor of the TWA 50. In the case where the TWA 50 is also used as an optical gate, the gain can be controlled with an external control signal.

The operation of the first embodiment of the invention will be described. A light beam under measurement is applied to the TWA 50, where it is amplified with a constant gain or variable gain corresponding to a current signal applied from the current source 76. The amplified light beam is applied through a lens 12 in an input optical system to the photocathode 14 of the streak tube in the single sweep type streak camera 70. The applied light beam is converted into an electron image, which is accelerated and led to the MCP 24. In this operation, since a high speed sawtooth wave is being applied to the deflecting electrodes 22, the electron beam is deflected downwardly, in a sweep mode, by the deflecting electrodes 22 before reaching the MCP 24.

In order for the sweep to be carried out in synchronization with the passage of the electron image through the deflecting electrodes 22, part of the incident light beam or excited light beam is utilized to form a trigger signal to trigger the single sweep circuit 72. The electron image applied to the MCP 24 is multiplied by the MCP 24, and is then converted into an optical image by means of the phosphor screen. The optical image is detected by an image pickup device 28 such as a television camera or CCD camera, so that the luminance data image is analyzed and measured. As a result, an image corresponding to the streak image, or the variation in intensity of the light signal under measurement is displayed on display unit 29.

As described above, in the first embodiment, the single sweep type streak camera 70 is employed as the photodetector 42. Therefore, with the first embodiment, mainly a single phenomenon or high-speed repetitive phenomenon of 20 KHz or less can be observed. In addition, the high-speed gating function of the TWA 50 may be utilized to measure part of a high-speed repetitive phenomenon or continuous phenomenon with high accuracy and with high time resolution.

Figure 12:
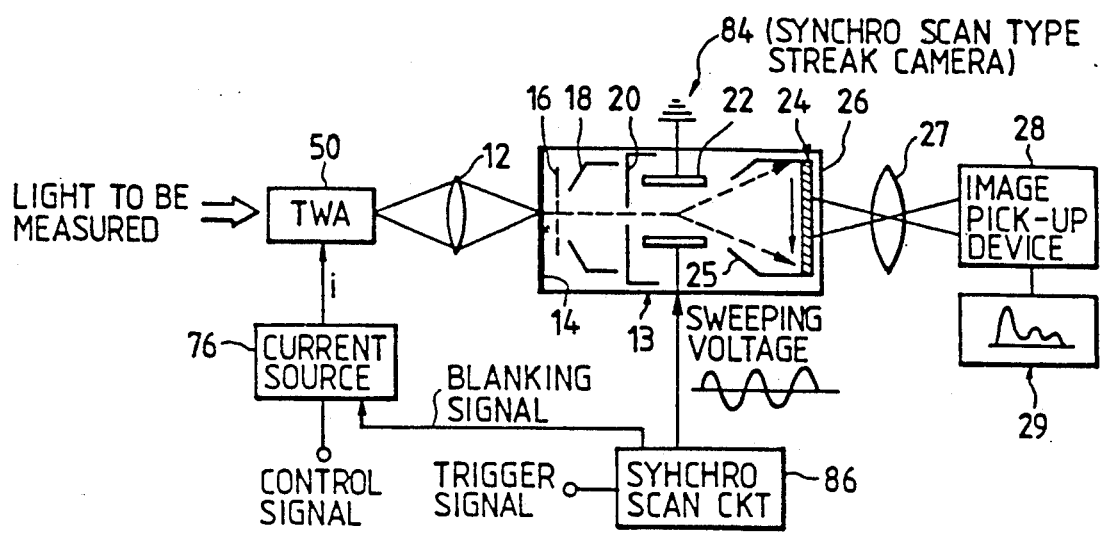
FIG. 12 is a schematic diagram depicting a second embodiment of the optical waveform measuring device in accordance with the present invention.

A second embodiment of the invention will be described in detail with reference to FIG. 12. The second embodiment is designed as follows. In an optical waveform measuring device similar to the one shown in FIG. 11 (the first embodiment), for instance, a synchro scan type streak camera 84 with a synchro scan circuit 86 for generating a sine wave sweep voltage is employed as the photodetector 42.

In the second embodiment, the sweep is carried out with a sine wave produced by the synchro scan circuit 86, and therefore a high-speed repetitive sweep of the order of 75 to 165 MHz can be performed. Furthermore, when a repetitive optical phenomenon is synchronized with a sweep frequency so that streak images are formed at the same position on the phosphor screen for integration, weak optical phenomena can be measured with a high S/N ratio. In addition, if the high-speed gating function of the TWA 50 is utilized, then part of a high-speed repetitive phenomenon or continuous phenomenon can be measured with high accuracy. During the synchro scan return period, the signal can be cut. In this case, the synchro scan circuit 86 provides a blanking voltage, which is used as a control signal for the current source 76.

Figure 13:
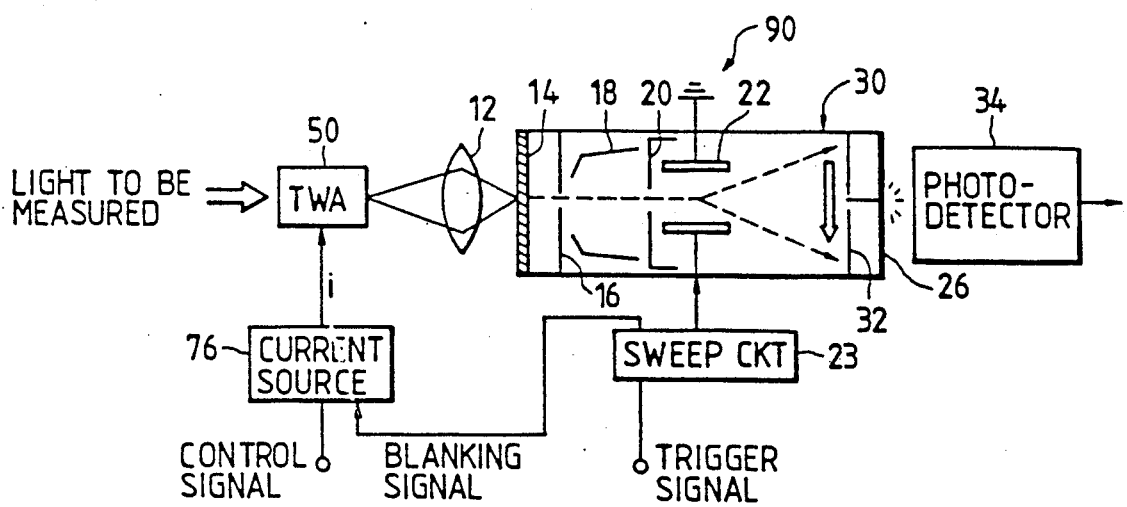
FIG. 13 is a schematic diagram depicting a third embodiment of the optical waveform measuring device in accordance with the present invention.

A third embodiment of the invention will be described with reference to FIG. 13.

The third embodiment is designed as follows: In an optical waveform measuring device similar to that which is shown in FIG. 11 (the first embodiment), the single sweep type streak camera 70 is replaced with a sampling type optical oscilloscope 90 with a sampling streak tube 30 whose fundamental arrangement is as shown in FIG. 19.

Figure 14:
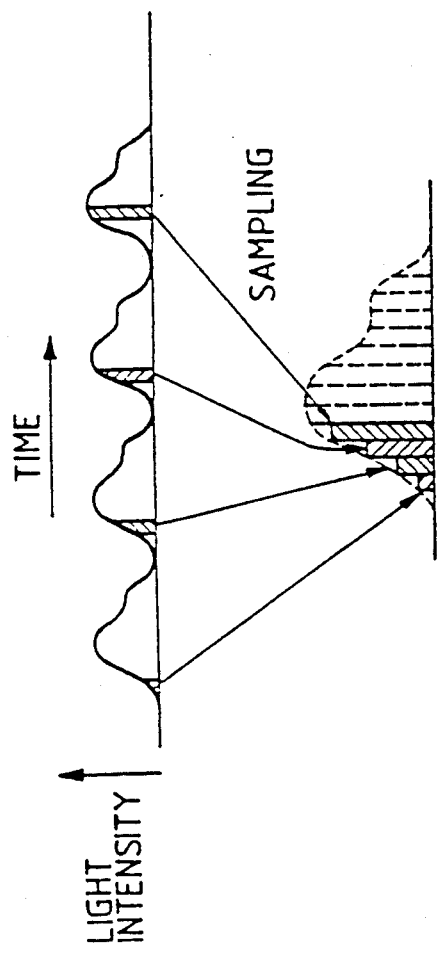
FIG. 14 is a graphic description of the operation of the third embodiment of the optical waveform measuring device depicted in FIG. 13.
Figure 18:
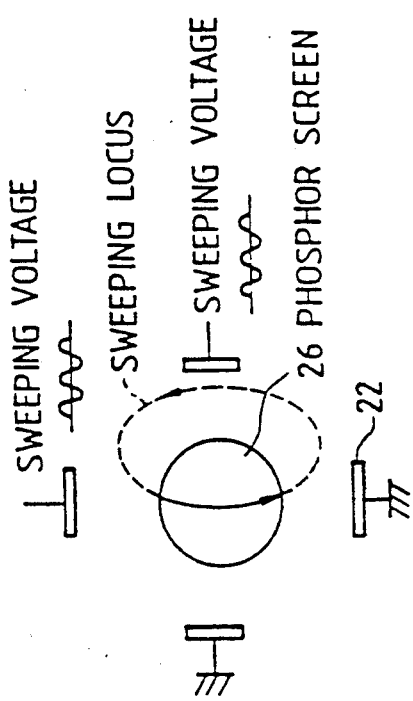
FIG. 18 is an diagram showing the locus of sweep in a synchronous blanking operation as described in connection with FIC. ..

In the third embodiment, a light beam under measurement is detected as signals sampled electrically. Therefore, by repeatedly carrying out a sampling operation at certain time intervals, the optical intensity waveform of the light beam under measurement can be obtained as shown, for instance, in FIG. 14. If, in this operation, the high-speed gating function of the TWA 50 is also utilized, then part of a high-speed repetitive phenomenon or continuous phenomenon can be measured with high accuracy and with high S/N ratio, and during the return sweep period, the signal can be cut. In this operation, a sweep circuit 23 produces a blanking signal, which is applied, as a control signal, to the current source 76.

Figure 15:
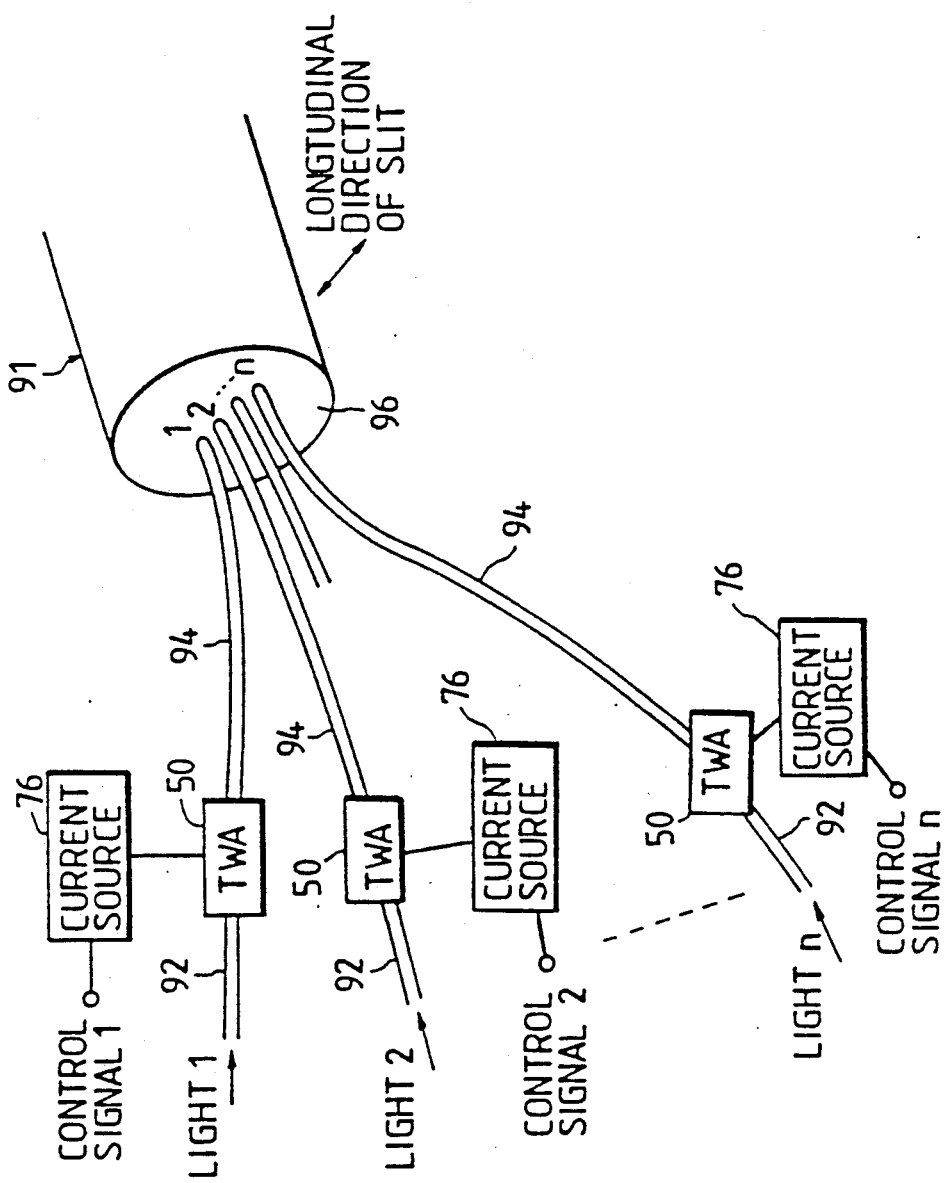
FIG. 15 is a perspective view of a fourth embodiment of an optical waveform measuring device in accordance with the present invention.

A fourth embodiment of the invention will be described in detail with reference to FIG. 15. The fourth embodiment is designed as follows. In an optical waveform measuring device similar to the one shown in FIG. 11 (the first embodiment) or FIG. 12 (the second embodiment), a plurality of TWAs 50 are provided each having a current source 76. Light beams 1 through n under measurement are applied through optical fibers 92 to the TWAs 50, respectively, and the output light beams of the TWAs 50 are applied to a streak camera. As disclosed by Japanese patent application (OPI) No. 183857/1986, the streak camera comprises a streak tube 91 with a fiber cable to which a number of optical fibers 94 are connected.

In the fourth embodiment, streak images, corresponding to the light signals 1 through n under measurement, are formed on the phosphor screen 20 in the longitudinal direction of the slit. Therefore, in the fourth embodiment, a number of light signals can be observed in a parallel mode. Furthermore, if the length of the optical fibers 92 or 94 connected to the TWAs 50 are changed, the timing of incidence of light beams under measurement can be changed. This makes it possible to observe a single waveform in a series mode. Furthermore, the optical waveform measuring device may be modified as follows. Light beams under measurement are sorted out with a spectroscope according to wavelength, and they are amplified by the TWAs 50 provided separately according to the wavelengths previously detected.

Figure 16:
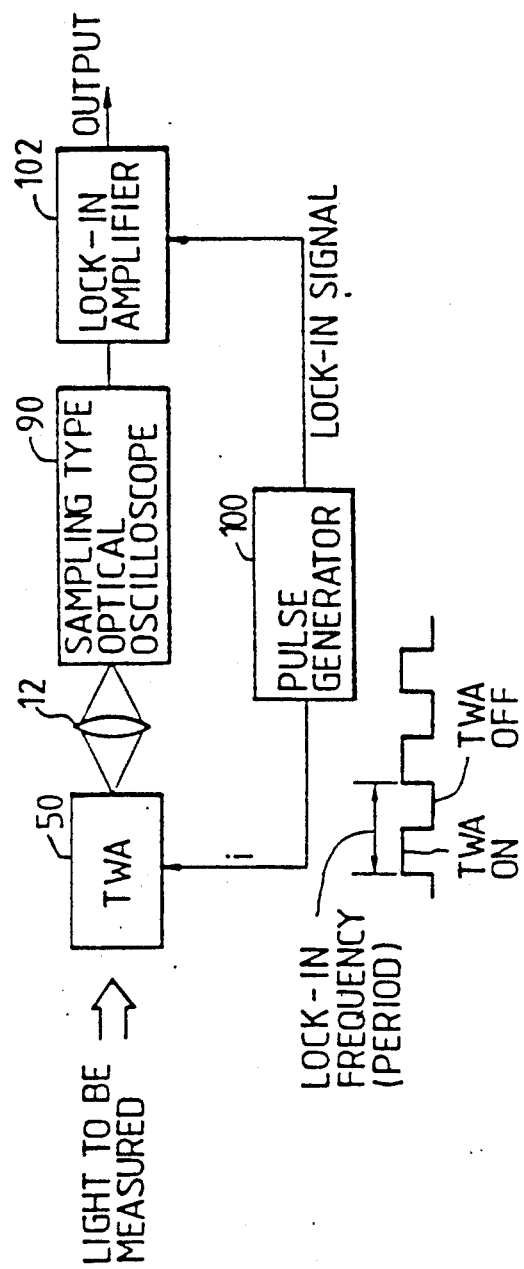
FIG. 16 is a schematic diagram depicting a fifth embodiment of the optical waveform measuring device in accordance with the present invention.

A fifth embodiment of the invention will be described in detail with reference to FIG. 16. The fifth embodiment is designed as follows. In an optical waveform measuring device similar to the one shown in FIG. 11 (the first embodiment), a sampling type optical oscilloscope 90 having a sampling streak tube 30 is employed as the photodetector 42. The optical waveform measuring device further comprises a pulse generator 100 for generating a lock-in detecting pulse signal (lock-in signal). The output of the pulse generator 100 drives a TWA 50, that also operates as a light chopping element, to turn on and off a light beam under measurement with a predetermined frequency (lock-in frequency). The output of the pulse generator 100 is further applied to a lock-in amplifier 102 having a narrow band width for detecting only a predetermined frequency component of the output of the sampling type optical oscilloscope 90.

The fifth embodiment can perform lock-in detection of the output of the sampling type optical oscilloscope 90 (which is the output electrical signal of the photodetector 34 receiving the output of the sampling streak tube 30), thus further improving the S/N ratio in the signal detecting operation.

In the fifth embodiment, the TWA 50 is employed as a light chopping element. Therefore, the optical waveform measuring device has a simple construction. Furthermore, another TWA may be connected to the first mentioned TWA 50, as a light chopping element, or a conventional light chopping element may be used. In addition, the pulse generator 100 may be eliminated, so that, instead of an external lock-in system, the self clock-in system may be employed.

It will be apparent to those skilled in the art that various modifications and variations could be made to the embodiments of the invention without departing from the scope of spirit of the invention.

What is claimed is:

1. An optical waveform measuring device, comprising:
   an optical amplifier to which a light beam under measurement is applied, said light beam under measurement having an original wavelength and said amplifier amplifying the intensity of said light beam under measurement at or near said original wavelength;
   a photodetector having means for generating an electron image in response to an amplified light beam generated by said optical amplifier in response to said light beam under measurement.

2. An optical waveform measuring device as set forth in claim 1, wherein said photodetector is a streak tube.

3. An optical waveform measuring device as set forth in claim 1, wherein said optical amplifier is a non-resonance traveling-wave type optical amplifier; and said non-resonance type amplifier is provided as a semiconductor laser having a anti-reflection coatings on both end faces for preventing optical reflection therefrom.

4. An optical waveform measuring device as set forth in claim 3, wherein each of said end faces is cut at an angle equal to the Brewster angle.

5. An optical waveform measuring device as set forth in claim 1, wherein said optical amplifier is a Fabry Perot type optical amplifier.

6. An optical waveform measuring device as set forth in claim 1, wherein said optical amplifier comprises a solid state laser medium pumped by an exciting light beam from a semiconductor laser.

7. An optical waveform measuring device as set forth in claim 1, wherein said optical amplifier comprises a laser medium pumped by an exciting light beam from a semiconductor laser.

8. An optical waveform measuring device as set forth in claim 1, wherein said optical amplifier comprises a gas laser medium.

9. An optical waveform measuring device as set forth in claim 1, wherein said optical amplifier comprises a dye laser medium.

10. An optical waveform measuring device as set forth in claim 7, wherein said light source comprises a light emitting diode.

11. An optical waveform measuring device as set forth in claim 7, wherein said light source comprises a current controlled lamp.

12. An optical waveform measuring device as set forth in claim 1, wherein said optical amplifier includes a gas laser medium, at least two opposing electrodes and a current-to-voltage converter, said medium disposed between said electrodes and said converter for applying a voltage across the electrodes to excite said medium.

13. An optical waveform measuring device as set forth in claim 1 wherein the gain of said optical amplifier is variable and said optical amplifier serves as a light gate.

14. An optical waveform measuring device as set forth in claim 3 wherein the gain of said optical amplifier is variable and said optical amplifier serves as a light gate.

15. An optical waveform measuring device as set forth in claim 1, wherein said means for generating an electron image includes an electron sampling slit plate for spatially limiting said electron image.

16. An optical waveform measuring device as set forth in claim 2, wherein said means for generating an electron image includes an electron sampling slit plate for spatially limiting said electron image.

17. An optical waveform measuring device as set forth in claim 15 and 16, wherein the photodetector generates a sampling output, said device further comprising a light chopping element for turning on and off said light beam under measurement at a predetermined frequency and a lock-in amplifier having a narrow band width for detecting a predetermined frequency component out of said sampling output of said photodetector.

18. An optical waveform measuring device as set forth in claim 1, the device further comprising at least two optical amplifiers for amplifying light, the outputs of which are applied through optical fibers to said means for generating an electron image of said photodetector such that said outputs are arranged in a line on said means for generating an electron image.

19. An optical waveform measuring device as set forth in claim 1, wherein said photodetector includes means for converting an electron image into an optical image, the waveform measuring device further comprising an image pickup device for detecting said optical image and a display unit for displaying an output signal of said image pickup device.

20. An optical waveform measuring device as set forth in claim 2, wherein said photodetector includes means for converting an electron image into an optical image, the waveform measuring device further comprising an image pickup device for detecting said optical image and a display unit for displaying an output signal of said image pickup device.

21. An optical waveform measuring device as set forth in claim 3, wherein said photodetector includes means for converting an electron image into an optical image, the waveform measuring device further comprising an image pickup device for detecting said optical image and a display unit for displaying an output signal of said image pickup device.

22. An optical waveform measuring device as set forth in claim 13 or 14, wherein said photodetector includes means for converting an electron image into an optical image, the waveform measuring device further comprising an image pickup device for detecting said optical image and a display unit for displaying an output signal of said image pickup device.

23. An optical waveform measuring device as set forth in claim 15 or 16, wherein said photodetector includes means for converting an electron image into an optical image, the waveform measuring device further comprising a second-detector for detecting said optical image and a display unit for displaying an output signal of said second photo-detector.

24. An optical waveform measuring device as set forth in claim 17, wherein said light chopping element comprises a non-resonance traveling-wave type optical amplifier.

25. An optical waveform measuring device as set forth in claim 19, wherein said means for converting an electron image into an optical image comprises a phosphor screen.

26. An optical waveform mesuring device as set forth in claim 20, wherein said means for converting an electron image into an optical image comprises a phosphor screen.

27. An optical waveform measuring device as set forth in claim 21, wherein said means for converting an electron image into an optical image comprises a phosphor screen.

28. An optical waveform measuring device as set forth in claim 22, wherein said means for converting an electron image into an optical image comprises a phosphor screen.

29. An optical waveform measuring device as set forth in claim 23, wherein said means for converting an electron image into an optical image comprises a phosphor screen.

* * * * *

UNITED STATES PATENT AND TRADEMARK OFFICE
CERTIFICATE OF CORRECTION

PATENT NO. : 4,988,859

DATED : January 29, 1991

INVENTOR(S) : Yutaka Tsuchiya et al.

It is certified that error appears in the above-identified patent and that said Letters Patent is hereby corrected as shown below:

Claim 3, column 10, line 35, after "having" delete "a";

Claim 13, column 11, line 2, after "1" insert --,--;

Claim 14, column 11, line 6, after "3" insert --,--;

Claim 17, column 11, line 18, after "15" change "and" to --or--.

Signed and Sealed this

Twenty-third Day of February, 1993

*Attest:*

STEPHEN G. KUNIN

*Attesting Officer*  Acting Commissioner of Patents and Trademarks